United States Patent Office 2,786,876
Patented Mar. 26, 1957

2,786,876

DEMETHYLATION OF METHYLBENZENES

Harry L. Coonradt, Woodbury, and Wilbur K. Leaman, Pitman, N. J., assignors to Socony Mobil Oil Company, Inc., a corporation of New York No Drawing. Application September 16, 1952, Serial No. 309,926

4 Claims. (Cl. 260—672)

This invention relates to the conversion of methyl-substituted monocyclic organic compounds. It is more particularly concerned with the demethylation of methylbenzenes.

Frequently, during the production of aromatic compounds, e. g., in refining of hydrocarbons there are obtained large amounts of methylbenzenes for which there is no immediate demand. Depending upon the existing commercial requirements, it is desirable to convert such methylbenzenes to benzene or to other more desirable methylbenzenes, in good yields and with a minimum of coking. Thus, for example, a refinery operation may produce large amounts of toluene, at a time when there is slight market demand for toluene, but a great demand for benzene. In such cases, it is desirable to be able to demethylate the toluene to benzene by means of a simple, economical process. Similarly, it is often desirable to convert other methylbenzenes to more desirable compounds. Thus, xylene could be converted to toluene and benzene.

As is well known to those skilled in the art, operations involving the demethylation of methylbenzenes is much more difficult to achieve than dealkylation operations upon benzenes having alkyl groups of two or more carbon atoms. The catalyst employed and the reaction conditions involved in demethylation of methylbenzenes are highly critical factors. Thus, in British Patent No. 637,595, it has been proposed to demethylate methylbenzenes in the presence of a catalyst consisting of activated alumina or of activated alumina and hydrogen chloride. It is specifically taught therein that other catalysts, such as chromia-alumina and silica-alumina, are ineffective demethylation catalysts.

It has now been found that the conversion of methylbenzenes into lower methylated benzenes can be effected, in excellent yields, in the presence of specific silica-alumina catalysts. It has now been discovered that methylbenzenes can be demethylated in the presence of a silica-alumina cracking catalyst containing specific amounts of silica, in the presence of hydrogen gas under pressure, and under critical temperature conditions.

Accordingly, it is an object of the present invention to provide a catalytic process for converting methylbenzenes to other valuable benzenoid hydrocarbons. Another object is to provide a method for demethylating methylbenzenes in the presence of silica-alumina catalysts in the presence of hydrogen gas. A specific object is to provide a process for producing benzene from methylbenzenes, such as toluene and xylenes, by contacting the methylbenzene with a bead-form silica-alumina catalyst, in the presence of hydrogen under pressure and at specific critical temperatures. Other objects and advantages of the present invention will become apparent to those skilled in the art from the following detailed description.

The present invention provides a process for demethylating methylbenzenes to other valuable benzenoid hydrocarbons, which comprises contacting a methylbenzene with a silica-alumina cracking catalyst, containing between about 5 percent and about 20 percent alumina, the balance being silica, at a temperature of between about 900° F. and about 1200° F., for a contact time of between about 40 seconds and about 1000 seconds, and in the presence of hydrogen gas under superatmospheric pressures.

The aromatic hydrocarbons which are demethylated by the process of this invention are the methylbenzenes, i. e., aromatic hydrocarbons consisting of a benzene nucleus having one or more methyl groups attached thereto. In the case of the polymethylbenzenes, one or more methyl groups can be removed, according to the desired end product. Thus, for example, xylene can be demethylated to produce either benzene or toluene, or both. The present process is also applicable to charge stocks containing methylbenzenes in admixture with other hydrocarbons, such as highly-aromatic petroleum fractions and the like. Non-limiting examples of the methylbenzenes contemplated herein are toluene, o-xylene, m-xylene, p-xylene, hemimellitene, pseudocumene, mesitylene, prehnitene, durene, and pentamethylbenzene; and mixtures of hydrocarbons containing one or more of these compounds.

The catalyst utilizable in the process of this invention is a silica-alumina cracking catalyst. It ordinarily comprises between about 5 percent and about 20 percent, by weight, of alumina, with the balance, i. e., between about 95 percent and about 80 percent, by weight, being silica. Preferably, the catalyst contains between about 8 percent and about 15 percent alumina, by weight. Also, there can be incorporated into the catalysts minute amounts of materials adapted to improve other characteristics of the catalyst. For example, minute amounts, between about 0.05 percent and about 1.0 percent, by weight, of chromia can be added to the catalyst to assist in after burning properties of the catalyst during regeneration. This amount of chromia is not a promoter, since it does not affect the catalytic activity. Such a catalyst is still basically a silica-alumina catalyst with respect to activity. Such catalysts are described in copending application Serial No. 127,626, filed November 16, 1949 now Patent No. 2,647,860. The silica-alumina catalyst can be in any usual form in which such catalysts are used, i. e., rods pellets, spheres, etc. Preferably, however, the catalyst is in the form of spheroidal, bead-like particles, having a particle size of between about 4 and about 12 mesh. Such particles can be prepared, feasibly, in accordance with the method described in United States Letters Patent No. 2,384,946. Reference should be made thereto for the procedures involved.

The process of this invention is effected by contacting the methylbenzene charge material with the catalyst, at elevated temperatures, for a relatively short period of time, in a reaction vessel suitable for carrying out catalytic reactions, and having provision for heat input and removal to maintain catalyst temperature. The process, of course, can be performed batchwise. Preferably, however, a continuous operation is used. In such an operation, the charge is passed through the reactor in contact with the catalyst. Then the reaction product is subjected to a product separation operation. The portion of the charge stock which remains undemethylated (as with polymethylbenzenes) can be recycled to the reactor, until the maximum ultimate conversion has been effected.

It has been found that the temperature of the reaction, usually measured in terms of the catalyst temperature, is a critical factor and is determinative of the reaction involved. At temperatures of between about 900° F. and about 1050° F., the disproportionation reaction tends to take place, even in the presence of hydrogen under pressure. In order to achieve demethylation, the reaction temperature must be maintained at between about 1050° F. and about 1200° F., and preferably at between about 1050° F. and about 1150° F. The contact time is dependent upon the temperature involved, upon the nature of the charge material, and upon the pressure used. In general, the contact time varies, inversely with the temperature, between about 40 seconds and about 1000 seconds. Preferably, the contact time varies between about 50 seconds and 500 seconds.

As mentioned hereinbefore, the present process is carried out in the presence of hydrogen under pressure. At atmospheric pressure, the process proceeds to low yield, disproportionation, and a higher amount of coke. The pressure of the hydrogen gas must be at least about 50 pounds per square inch gauge. It can be as high as about 2000 pounds per square inch gauge. The preferred range of pressures, however, is between about 100 and about 500 pounds per square inch gauge.

Hydrogen can be added to the methylbenzene charge stock in molar proportions of hydrogen to methylbenzene reactant of between about 1:2, respectively, and about 10:1, respectively. In parctice, molar proportions of between about 1:1, respectively, and about 5:1, respectively, are preferable. The hydrogen can be in the form of relatively pure hydrogen gas, or it can be introduced via a hydrogen-rich gas mixture, e. g., the effluent gas from a refinery reforming unit.

The following examples are for the purpose of demonstrating the processes of this invention. It must be strictly understood that this invention is not to be limited to the specific conditions or reactants used in the examples, or to the operations and manipulations involved therein. Other conditions and charge materials, as set forth hereinbefore, can be employed, as those skilled in the art will readily understand.

APPARATUS AND OPERATION

The reactor used in the runs described in the examples was a stainless steel tube suspended in a bath of molten lead. The temperature of the lead was controlled to maintain the catalyst temperature constant to within about 10° F. Catalyst temperature was measured by means of thermocouples extending into the top, middle, and bottom portions of the catalyst bed. A total volume of about 150 cubic centimeters of catalyst was placed in the reactor. Accessory equipment included a heated, thermostatically controlled burette for measuring the charge, pumps, preheater coils, a condensing and collecting system for aromatic and gaseous products, and a system for determining the amount of coke on the catalyst by a combustion method.

In operation, the catalyst, at operating temperature, was purged with nitrogen gas; followed by a flushing with hydrogen, when used in the run. Then, the charge material, in the liquid state, together with added gases or liquids was passed through a preheater to raise the temperature thereof to the reaction temperature. The combined charge was then passed downwardly through the catalyst bed at a rate sufficient to effect the desired contact time. A sample of the total gas collected was analyzed in the mass spectrometer to determine its composition and the weight of the components. The principal component was methane.

The amount of coke laid down on the catalyst was determined by combustion methods, i. e., by converting it to carbon dioxide and analyzing therefor. The relative amounts of aromatic materials present in a sample of the liquid products was determined by usual methods, i. e., by mass spectrometer, ultraviolet light spectrometer, distillation, etc.

REACTIONS IN THE PRESENCE OF HYDROGEN

Examples 1 through 3

Runs were made using a silica-alumina bead cracking catalyst prepared as described in U. S. Patent No. 2,384,946. This catalyst contained about 9 percent alumina, by weight, and about 91 percent silica, by weight, and it had an Activity Index of about 46 (a measure of catalytic activity determined by testing in a Cat-A unit, using the method set forth by Alexander and Shimp, National Petroleum News, vol. 36, P. R.–537, August 2, 1944). The charge stock used in Examples 1 and 2 was toluene. Xylene was used in Example 3. Temperatures employed were 1000° F. and 1100° F. with hydrogen added under a pressure of 400 pounds per square inch, gauge. Pertinent data for these runs are set forth in Table I.

Examples 4 through 7

In order to demonstrate the effect of hydrogen pressure, a series of runs were made in which toluene was demethylated under various hydrogen pressures. In Examples 4, 5, and 6, there was used a silica-alumina bead cracking catalyst containing about 9 percent alumina, by weight, and about 91 percent, by weight, silica, with about 0.15 weight percent of chromia added thereto. This catalyst, as was discussed hereinbefore, is functionally the same as the catalyst used in Examples 1–3. The catalyst used in Example 7 was the same as used in Examples 1–3. In the runs, the temperature, the L. H. S. V. and the molar proportion of hydrogen were maintained constant. The pressure was varied between about atmospheric pressure (Example 7) and about 400 pounds per square inch gauge. Pertinent data for these runs are set forth in Table I.

TABLE I.—REACTIONS IN THE PRESENCE OF HYDROGEN

| Example | Hydrocarbon Feed | Catalyst | Temp., °F. | Contact Time, Sec. | Pressure, p.s.i.g. | Moles $H_2$/Mole Hydrocarbon | Weight Percent per Pass | | | | | | Ultimate Weight Percent | | | | |
|---------|------------------|----------|------------|--------------------|--------------------|------------------------------|-------------------------|---|---|---|---|---|-------------------------|---|---|---|---|
| | | | | | | | Benzene | Toluene | Xylenes | Trimethylbenzenes | Coke | Gas | Benzene | Xylenes | Trimethylbenzenes | Coke | Gas |
| 1 | Toluene | (a) | 1,000 | 164 | 400 | 3.0 | 21.4 | 51.4 | 14.7 | 1.4 | 5.0 | 5.0 | 44.9 | 30.7 | 3.0 | 10.5 | 10.5 |
| 2 | do | (a) | 1,100 | 180 | 400 | 2.4 | 43.5 | 36.4 | 3.8 | 0.1 | 5.6 | 9.2 | 70.6 | 6.1 | 1.8 | 8.9 | 14.5 |
| 3 | Xylene | (a) | 1,100 | 220 | 400 | 2.2 | 25.3 | 33.2 | 12.7 | 1.0 | 14.9 | 17.7 | 27.5 | c 36.2 | 16.2 | 19.3 |
| 4 | Toluene | (b) | 1,100 | 153 | 400 | 3.0 | 40.1 | 47.9 | 4.5 | 0.3 | 4.2 | 4.7 | 74.6 | 8.5 | 0.5 | 7.8 | 8.7 |
| 5 | do | (b) | 1,100 | 88 | 200 | 2.6 | 23.4 | 64.9 | 7.1 | 0.4 | 2.2 | 5.3 | 61.8 | 18.6 | 1.0 | 5.9 | 13.9 |
| 6 | do | (b) | 1,100 | 44 | 100 | 2.5 | 11.3 | 75.2 | 4.8 | 0.2 | 2.0 | 2.5 | 54.3 | 23.2 | 1.2 | 9.5 | 12.0 |
| 7 | do | (a) | 1,100 | 4.4 | 5–10 | 2.6 | 5.6 | 84.3 | 1.9 | 0.3 | 4.9 | 3.2 | 35.6 | 12.3 | 0.2 | 31.6 | 20.4 | a Silica-alumina bead catalyst—46 Activity Index—9% $Al_2O_3$, 91% $SiO_2$.
b Silica-alumina-chromia bead catalyst—29 Activity Index—9% $Al_2O_3$, 91% $SiO_2$+0.15% $Cr_2O_3$.
c Ultimate weight percent is toluene from xylene.

It will be apparent, from the data set forth in Table I, that efficient demethylation of methylbenzenes is effected in the presence of a silica-alumina catalyst, at temperatures above about 1050° F., and in the presence of hydrogen gas at superatmospheric pressures. Under similar conditions, but at temperatures below about 1050° F., substantial disproportionation takes place. The foregoing examples also show that the pressure involved must be greater than atmospheric pressure. In the absence of hydrogen, however, the disproportionation process becomes significant and large amounts of coke are formed, as shown in the following examples.

REACTIONS IN THE ABSENCE OF HYDROGEN

Examples 8 through 10

Runs were made using the catalyst described in Examples 1-3, but in the absence of hydrogen and at atmospheric pressure. Toluene was used as the charge stock for Examples 8 and 9, and xylene for Example 10. The temperatures employed were 1000° F. and 1100° F. Pertinent data for these runs are set forth in Table II.

Example 11

In order to demonstrate that pressure conditions are not conducive to demethylation in the absence of hydrogen, a run was made using the catalyst of Examples 4-6. This run was operated under a pressure of about 400 pounds per square inch gauge, of a chemically inert gas, nitrogen gas. The conditions of L. H. S. V. and temperature were the same as in Example 10. Pertinent data are set forth in Table II.

alumina cracking catalyst containing between about 5 percent and about 20 percent alumina and between about 95 percent and about 80 percent silica, at a temperature of between about 1050° F. and about 1200° F., for a contact time of between about 40 seconds and about 1000 seconds, and in the presence of hydrogen gas under a pressure of between about 100 pounds per square inch gauge, and about 500 pounds per square inch gauge.

2. A process for the demethylation of methylbenzenes, which comprises contacting a methylbenzene with a silica-alumina cracking catalyst containing between about 8 percent and about 15 percent alumina and between about 92 percent and about 85 percent silica, at a temperature of between about 1050° F. and about 1150° F., for a contact time of between about 50 seconds and about 500 seconds, and in the presence of hydrogen gas under a pressure of between about 100 pounds per square inch gauge, and about 500 pounds per square inch gauge.

3. A process for demethylating toluene, which comprises contacting toluene with a bead-form silica-alumina cracking catalyst containing about 9 percent alumina and about

TABLE II.—REACTIONS IN THE ABSENCE OF HYDROGEN

| Example | Hydrocarbon Feed | Catalyst | Temp., ° F. | Contact Time, Sec. | Pressure, p. s. i. g. | Moles $H_2$/Mole Hydrocarbon | Weight Percent per Pass | | | | | | Ultimate Weight Percent | | | | |
|---|---|---|---|---|---|---|---|---|---|---|---|---|---|---|---|---|---|
| | | | | | | | Benzene | Toluene | Xylenes | Trimethylbenzenes | Coke | Gas | Benzene | Xylenes | Trimethylbenzenes | Coke | Gas |
| 8 | Toluene | (a) | 1,000 | 23 | 0 | 0 | 7.8 | 82.5 | 7.4 | 0.4 | 1.2 | 0.7 | 44.6 | 42.3 | 2.2 | 6.8 | 4.0 |
| 9 | do | (a) | 1,100 | 21 | 0 | 0 | 16.2 | 65.6 | 8.8 | 0.5 | 4.4 | 2.9 | 49.6 | 26.8 | 1.5 | 13.4 | 8.9 |
| 10 | Xylene | (a) | 1,100 | 26 | 0 | 0 | 4.9 | 27.5 | 36.5 | 5.2 | 15.8 | 7.1 | 8.1 | c 45.4 | 8.6 | 25.9 | 11.8 |
| 11 | Toluene | (b) | 1,100 | 175 | 400 | 2.5 $N_2$ | 37.8 | 39.3 | 5.1 | | 15.3 | 7.3 | 57.5 | 7.7 | | 23.5 | 11.1 | a Silica-alumina bead catalyst—46 Activity Index—9% $Al_2O_3$, 91% $SiO_2$.
b Silica-alumina-chromia bead catalyst—29 Activity Index—9% $Al_2O_3$, 91% $SiO_2$+0.15% $Cr_2O_3$.
c Ultimate weight percent is toluene from xylene.

From the foregoing examples, it will be apparent that demethylation of methylbenzenes is effected in excellent yields, with a minimum of coking, in the presence of a silica-alumina catalyst and of hydrogen gas under pressure. When operating in the absence of hydrogen, at atmospheric pressures, disproportionation and coking are encountered. Even when pressure is used, as with an inert gas, although demethylation is improved, coking is still high.

The products produced by the process of this invention have many uses, as those skilled in the art will readily appreciate. Thus, for example, benzene can be used as a solvent and as an intermediate for the production of many substances, such as chlorinated benzene insecticides, phenol, etc. Many halo compounds, cresols, and benzyl compounds are produced from toluene.

Although the present invention has been described with preferred embodiments, it is to be understood that modifications and variations can be resorted to without departing from the spirit and scope of this invention, as those skilled in the art will readily understand. Such variations and modifications are considered to be within the scope and purview of the appended claims.

What is claimed is:

1. A process for demethylating methylbenzenes, which comprises contacting a methylbenzene with a silica- 91 percent silica, at a temperature of about 1100° F., for a contact time of between about 50 seconds and about 500 seconds, and in the presence of hydrogen gas under a pressure of about 400 pounds per square inch gauge.

4. A process for the demethylation of xylene, which comprises contacting xylene with a bead-form silica-alumina cracking catalyst containing about 9 percent alumina and about 91 percent silica, at a temperature of about 1100° F., for a contact time of between about 50 seconds and about 500 seconds, and in the presence of hydrogen gas under a pressure of about 400 pounds per square inch gauge.

References Cited in the file of this patent

UNITED STATES PATENTS

| | | |
|---|---|---|
| 2,194,449 | Sachanen | Mar. 19, 1940 |
| 2,380,279 | Welty | July 10, 1945 |
| 2,384,942 | Marisic | Sept. 18, 1945 |
| 2,620,293 | Blue et al. | Dec. 2, 1952 |
| 2,647,860 | Plank et al. | Aug. 4, 1953 |
| 2,709,193 | Clough | May 24, 1955 |

FOREIGN PATENTS

| | | |
|---|---|---|
| 637,595 | Great Britain | May 24, 1950 |

OTHER REFERENCES

Thomas et al.: J. A. C. S., vol. 66, pages 1694-6 (1944).